United States Patent
Huang et al.

(10) Patent No.: US 11,558,126 B2
(45) Date of Patent: Jan. 17, 2023

(54) ECHO ESTIMATION SYSTEM AND ECHO ESTIMATION METHOD

(71) Applicant: Realtek Semiconductor Corporation, Hsinchu (TW)

(72) Inventors: Bo-Rong Huang, Hsinchu (TW); Cheng-Hsien Li, Hsinchu (TW); Tsung-En Wu, Hsinchu (TW); Yu-Tung Liao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 7 days.

(21) Appl. No.: 17/333,162

(22) Filed: May 28, 2021

(65) Prior Publication Data

US 2022/0014281 A1 Jan. 13, 2022

(30) Foreign Application Priority Data

Jul. 13, 2020 (TW) .................................. 109123601

(51) Int. Cl.
*H04B 17/15* (2015.01)
*H04B 17/00* (2015.01)
*H04B 17/29* (2015.01)

(52) U.S. Cl.
CPC ......... *H04B 17/0085* (2013.01); *H04B 17/15* (2015.01); *H04B 17/29* (2015.01)

(58) Field of Classification Search
CPC ... H04B 1/04; H04B 1/44; H04B 3/20; H04B 7/14; H04B 15/00; H04B 17/15; H04B 17/29; H04B 17/0085; H04L 5/14; H04L 12/26; H04L 15/16; H04L 25/02

USPC ........ 370/249, 267, 286, 290; 375/219, 222, 375/227, 257, 295, 316, 346
See application file for complete search history.

(56) References Cited

U.S. PATENT DOCUMENTS

| | | | |
|---|---|---|---|
| 5,822,426 A | 10/1998 | Rasmus et al. | |
| 7,068,982 B2 | 6/2006 | Creigh et al. | |
| 7,106,235 B1 | 9/2006 | Yen et al. | |
| 7,127,062 B2 | 10/2006 | Casier et al. | |
| 7,327,298 B2 | 2/2008 | Zabroda | |
| 7,554,933 B2 | 6/2009 | Huang et al. | |
| 9,419,779 B2 | 8/2016 | Pan et al. | |
| 2008/0267327 A1 | 10/2008 | Chen et al. | |
| 2011/0317564 A1 | 12/2011 | Saibi et al. | |
| 2018/0006794 A1* | 1/2018 | Lee .......................... H04L 5/14 |

OTHER PUBLICATIONS

IEEE Standards Association, "IEEE Standard for Ethernet," IEEE Std 802.3-2015 (Revision of IEEE Std 802.3-2012), chapter 40.6., pp. 239-260, 2016.

\* cited by examiner

*Primary Examiner* — Shawkat M Ali
(74) *Attorney, Agent, or Firm* — Locke Lord LLP; Tim Tingkang Xia, Esq.

(57) ABSTRACT

An echo estimation system includes a transceiver circuitry and a processor circuitry. The processor circuitry is coupled to the transceiver circuitry. The processor circuitry is configured to calculate linear echo power and non-linear echo power based on a signal under test in the transceiver circuitry. The linear echo power and the non-linear echo power are utilized to determine a quality of the transceiver circuitry or utilized to determine component parameters of the transceiver circuitry.

18 Claims, 5 Drawing Sheets

| | averaged echo power mean($E_{avg}$^2) (mV^2) | linear echo power mean(E1^2) (mV^2) | non-linear echo power mean(E2^2) (mV^2) | echo return loss -10*log10(mean($E_{avg}$^2)/A)+B (dB) | linear echo return loss -10*log10(mean(E1^2)/A)+B (dB) | non-linear echo return loss -10*log10(mean(E2^2)/A)+B (dB) |
|---|---|---|---|---|---|---|
| 1 | 5.59E+03 | 5.47E+03 | 0.3087 | 13.2846 | 13.3788 | 55.8633 |
| 2 | 3.26E+03 | 3.17E+03 | 0.2228 | 15.6265 | 15.7481 | 57.2795 |
| 3 | 1.35E+03 | 1.28E+03 | 0.158 | 19.4553 | 19.6866 | 58.7721 |
| 4 | 236.27 | 171.32 | 0.0875 | 27.0246 | 28.4206 | 61.3386 |
| 5 | 153.99 | 96.07 | 0.0866 | 28.8837 | 30.9328 | 61.3835 |
| 6 | 216.44 | 156.18 | 0.0901 | 27.4053 | 28.8224 | 61.2114 |
| 7 | 303.69 | 242.19 | 0.0933 | 25.9344 | 26.9171 | 61.0599 |
| 8 | 395.5 | 332.58 | 0.1001 | 24.7872 | 25.5397 | 60.7543 |

A: the averaged power on the media dependent interface obtained in operation S206
B: a gain value of the gain amplifier 160

FIG. 4

ECHO ESTIMATION SYSTEM AND ECHO ESTIMATION METHOD

RELATED APPLICATIONS

This application claims priority to Taiwan Application Serial Number 109123601, filed Jul. 13, 2020, which is herein incorporated by reference.

BACKGROUND

Field of Invention

The present disclosure relates to a communication technology. More particularly, the present disclosure relates to an echo estimation system and an echo estimation method that can estimate linear echo power and non-linear echo power.

DESCRIPTION OF RELATED ART

With the developments of communication technology, various communication systems have been developed and used in many different applications. For example, in a communication system using the full-duplex technology, the transceiver circuitry simultaneously transmits signals and receives signals on a twisted pair (TP). However, when the impedances of the hybrid circuit do not match or when the hybrid circuit itself has non-ideal characteristics, an echo signal is caused at the receiving end of the transceiver circuitry. The echo signal is one kind of noise, which affects the signal-to-noise ratio (SNR) of the receiving end of the transceiver circuitry to further affect the quality of the communication system.

SUMMARY

Some aspects of the present disclosure are to provide an echo estimation system. The echo estimation system includes a transceiver circuitry and a processor circuitry. The processor circuitry is coupled to the transceiver circuitry. The processor circuitry is configured to calculate linear echo power and non-linear echo power based on a signal under test in the transceiver circuitry. The linear echo power and the non-linear echo power are utilized to determine a quality of the transceiver circuitry or utilized to determine component parameters of the transceiver circuitry.

Some aspects of the present disclosure are to provide an echo estimation method. The echo estimation method includes the following operations: generating a signal under test by a transceiver circuitry; and calculating linear echo power and non-linear echo power based on the signal under test by a processor circuitry. The linear echo power and the non-linear echo power are utilized to determine a quality of the transceiver circuitry or utilized to determine component parameters of the transceiver circuitry.

As described above, the echo estimation system and echo estimation method of the present disclosure can estimate the linear echo power and the non-linear echo power of the transceiver circuitry. In this manner, the quality of the transceiver circuitry or the relevant circuit component parameters can be effectively/accurately determined to meet system requirements.

BRIEF DESCRIPTION OF THE DRAWINGS

The disclosure can be more fully understood by reading the following detailed description of the embodiment, with reference made to the accompanying drawings as follows:

FIG. 4 is a schematic diagram of determining a component parameter according to some embodiments of the present disclosure.

DETAILED DESCRIPTION

The embodiments in the following descriptions are described in detail with the accompanying drawings, but the examples provided are not intended to limit the scope of the disclosure covered by the present disclosure. The structure and operation are not intended to limit the execution order. Any structure regrouped by elements, which has an equal effect, is covered by the scope of the present disclosure. In addition, the drawings are merely for illustration and are not illustrated according original sizes. For ease of understanding, the same or similar components in the following descriptions will be described with the same symbols.

In the present disclosure, "connected" or "coupled" may refer to "electrically connected" or "electrically coupled." "Connected" or "coupled" may also refer to operations or actions between two or more elements.

Figure 1A:
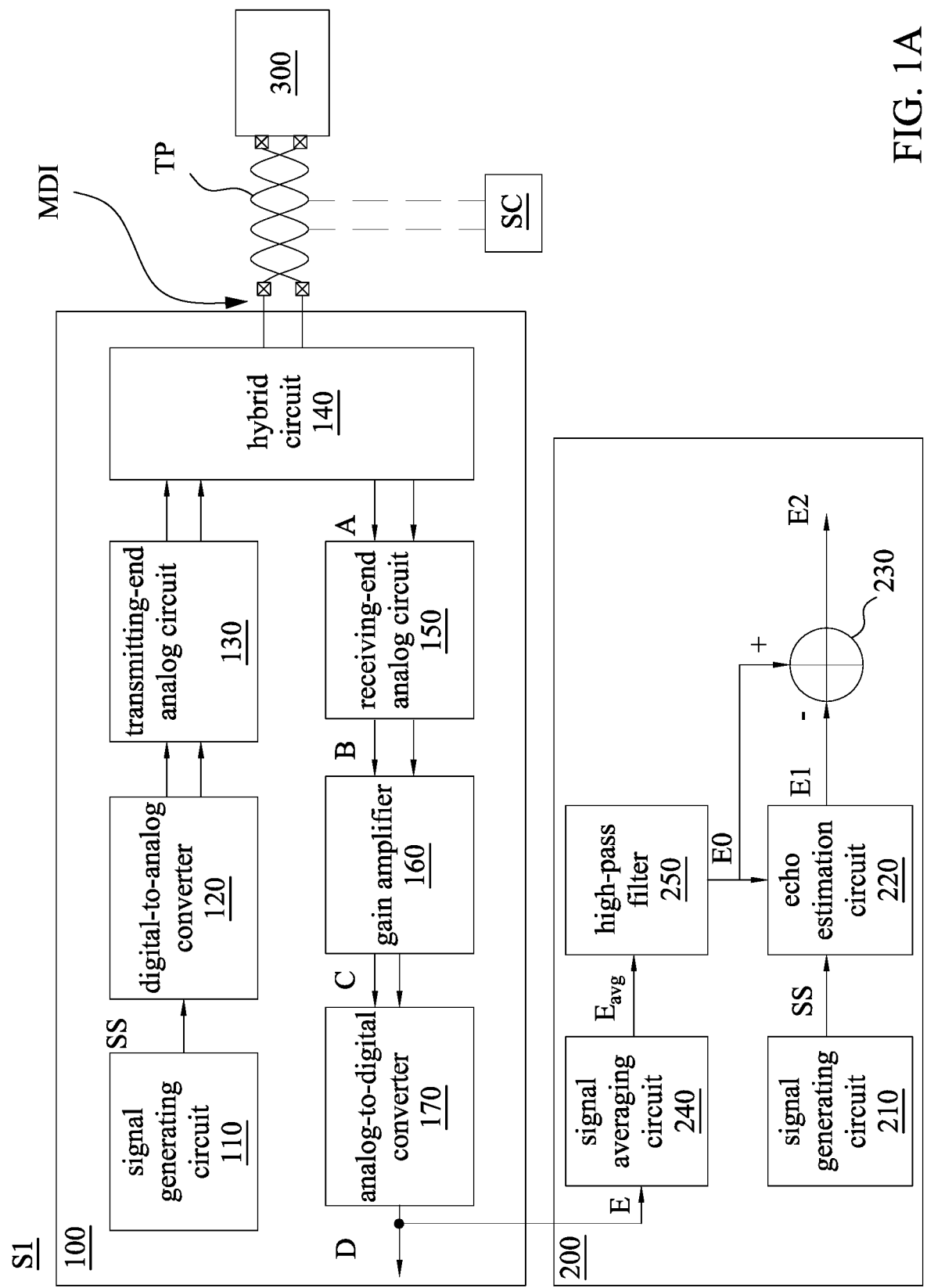
FIG. 1A is a schematic diagram of an echo estimation system according to some embodiments of the present disclosure.

Reference is made to FIG. 1A. FIG. 1A is a schematic diagram of an echo estimation system S1 according to some embodiments of the present disclosure. In one embodiment, the echo estimation system S1 is a Gigabit Ethernet communication system. As illustration in FIG. 1A, the echo estimation system S1 includes a transceiver circuitry 100, a processor circuitry 200, and a transceiver circuitry 300.

In some embodiments, the transceiver circuitry 100 and the processor circuitry 200 are configured in a device under test (DUT), and the transceiver circuitry 100 is coupled to the processor circuitry 200. The transceiver circuitry 300 is configured in a link partner (LP) device.

Figure 1B:
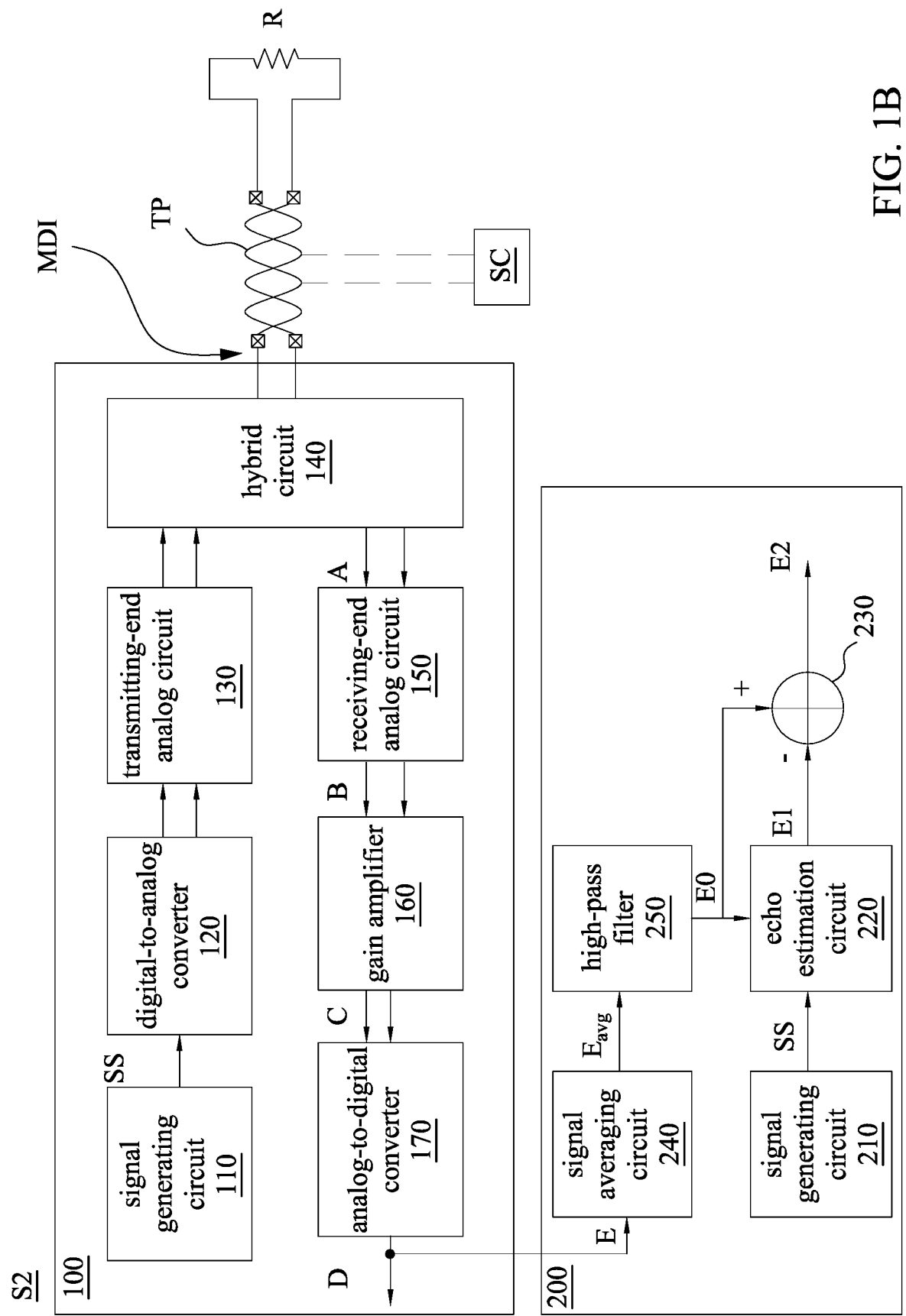
FIG. 1B is a schematic diagram of an echo estimation system according to some embodiments of the present disclosure.

Reference is made to FIG. 1B. FIG. 1B is a schematic diagram of an echo estimation system S2 according to some embodiments of the present disclosure. As illustration in FIG. 1B, a resistor R is disposed to replace the transceiver circuitry 300 in FIG. 1A.

As illustration in FIG. 1A and FIG. 1B. The transceiver circuitry 100 includes a signal generating circuit 110, a digital-to-analog converter 120, a transmitting-end analog circuit 130, a hybrid circuit 140, a receiving-end analog circuit 150, a gain amplifier 160, and an analog-to-digital converter 170. The signal generating circuit 110, the digital-to-analog converter 120, the transmitting-end analog circuit 130, and part of the hybrid circuit 140 may be regarded as a transmitting circuit (transmitting end), and the receiving-end analog circuit 150, the gain amplifier 160, the analog-to-digital converter 170, and part of the hybrid circuit 140 may be regarded as a receiving circuit (receiving end).

The signal generating circuit 110 generates a preset signal SS, and is coupled to the digital-to-analog converter 120. The digital-to-analog converter 120 is coupled to the transmitting-end analog circuit 130. The transmitting-end analog circuit 130 is coupled to the hybrid circuit 140. The hybrid circuit 140 is coupled to a twisted pair TP and the receiving-end analog circuit 150. The receiving-end analog circuit 150 is coupled to the gain amplifier 160. The gain amplifier 160 is coupled to the analog-to-digital converter 170.

A node between the hybrid circuit 140 and the receiving-end analog circuit 150 forms a receiving-end interface A. A node between the receiving-end analog circuit 150 and the gain amplifier 160 forms a receiving-end interface B. A node between the gain amplifier 160 and the analog-to-digital converter 170 forms a receiving-end interface C. An output terminal of the analog-to-digital converter 170 forms a receiving-end interface D.

In some embodiments, each of an output signal of the digital-to-analog converter 120, an output signal of the transmitting-end analog circuit 130, an output signal of the hybrid circuit 140, an output signal of the receiving-end analog circuit 150, an output signal of the gain amplifier 160 may be a pair of differential signals, and a signal value of each of these output signals may be a difference between the two corresponding differential signals. For example, if one of transmission lines coupled to an output terminal of the digital-to-analog converter 120 carries a signal value of +1, and another one of the transmission lines coupled to the output terminal of the digital-to-analog converter 120 carries a signal value of −1, then it represents that the output signal of the digital-to-analog converter 120 is +2.

The processor circuitry 200 includes a signal generating circuit 210, an echo estimation circuit 220, an adder 230, a signal averaging circuit 240, and a high-pass filter 250. The signal generating circuit 210 generates the preset signal SS, and is coupled to the echo estimation circuit 220. The echo estimation circuit 220 is coupled to the high-pass filter 250 and the adder 230. The adder 230 is coupled to the high-pass filter 250. The signal averaging circuit 240 is coupled to the transceiver circuitry 100 and the high-pass filter 250. The high-pass filter 250 is optional. In another embodiment, the processor circuitry 200 does not include the high-pass filter 250, and the signal averaging circuit 240 is coupled to the transceiver circuitry 100, the echo estimation circuit 220, and the adder 230. In another embodiment, the processor circuitry 200 does not include the signal generating circuit 210. The echo estimation circuit 220 receives the preset signal SS generated by the signal generating circuit 110 in the transceiver circuitry 100.

As for the operation of data/signal transmission performed between the device under test and a link partner, the digital-to-analog converter 120 converts a received digital signal into an analog signal and transmits it to the transmitting-end analog circuit 130. The transmitting-end analog circuit 130 may include a driver or a filter (such as a low-pass filter). The driver raises a voltage of a signal from the digital-to-analog converter 120 to a predetermined voltage. The low-pass filter filters out noises outside a filter bandwidth in the transmitted signal. A signal outputted from the transmitting-end analog circuit 130 is transmitted to the hybrid circuit 140. Accordingly, the hybrid circuit 140 generates a transmitting-end transmission signal (hereinafter referred to as a transmission signal), and transmits the transmission signal to the transceiver circuitry 300 through the twisted pair TP. In addition, the hybrid circuit 140 receives a far-end transmission signal from the transceiver circuitry 300 through the twisted pair TP, that is, a receiving-end reception signal (hereinafter referred to as a reception signal).

If the hybrid circuit 140 is ideal (for example, the impedances are perfectly matched), the hybrid circuit 140 can completely remove the transmission signal from a combination of the transmission signal and the reception signal. Therefore, the receiving end only receives a far-end signal from the link partner, and transmits this reception signal to the receiving-end analog circuit 150. The receiving-end analog circuit 150 may include a filter (such as a low-pass filter). The low-pass filter filters out noises outside a filter bandwidth in the reception signal. The gain amplifier 160 amplifies a signal from the receiving-end analog circuit 150 to generate an amplified analog signal. The analog-to-digital converter 170 converts the amplified analog signal from the gain amplifier 160 into a digital signal. The digital signal generated by the analog-to-digital converter 170 is transmitted to some other back-end circuit for subsequent processing.

Take a Gigabit Ethernet system for example. The back-end circuit may include a channel equalizer, a digital echo canceller, a channel crosstalk canceller, a signal synchronization processing circuit, or a physical coding sublayer. The channel equalizer equalizes a signal. The digital echo canceller utilizes the least mean square (LMS) algorithm to obtain an echo cancellation coefficient so as to eliminate a linear echo signal. The channel crosstalk canceller is used to eliminate crosstalk noises between channels. The signal synchronization processing circuit compensates a frequency offset and a phase offset between the device under test and the link partner. The physical coding sublayer transfers data bits to symbols through a scrambler and a mapping in the transmitting end, and the physical coding sublayer transfers symbols to data bits through a de-scrambler and a de-mapping in the receiving end.

However, the hybrid circuit 140 in an actual system is a non-ideal circuit (for example, the impedances are not perfectly matched), so the hybrid circuit 140 of the receiving end cannot completely remove the transmission signal from the combination of the transmission signal and the reception signal. Portions of the transmission signal that are not completely removed will leak back to the receiving-end analog circuit 150. This is the echo signal and is regarded as a noise. The echo signal will reduce the signal-to-noise ratio of the receiving end of the transceiver circuitry 100. In particular, the longer the linking distance is, the severer the reduced signal-to-noise ratio is.

Generally speaking, echo signals are classified into linear echo signals and non-linear echo signals. The linear echo signals are constructed by the linear combinations of the transmission signal. Echoes other than the linear echo signals are non-linear echo signals. Most of the non-linear echo signals are harmonic signals of the transmission signals that leak back to the receiving end.

Generally, the larger the echo return loss (ERL) is, the better the communication system handles the echo signal, that is, the lesser the signal-to-noise ratio of the receiving end will decrease due to the echo signal. In the present disclosure, the processor circuitry 200 can accurately estimate linear echo power and non-linear echo power of the receiving-end interface A, the receiving-end interface B, the receiving-end interface C, or the receiving-end interface D. The processor circuitry 200 can further calculate a linear echo return loss and a non-linear echo return loss of the receiving-end interface A, the receiving-end interface B, the receiving-end interface C, or the receiving-end interface D to effectively/accurately determine a quality of transceiver circuitry 100 or relevant circuit component parameters of the transceiver circuitry 100. For example, if the linear echo return loss and the non-linear echo return loss of the receiving-end interface A are within expected ranges, but the linear echo return loss and the non-linear echo return loss of the receiving-end interface B are abnormally small (which represents an abnormally large echo signal), then it represents that the receiving-end analog circuit 150 contributes most of the echo signal. According to this process/method, the receiving-end analog circuit 150 is determined as abnormal (for example, poor design). A control circuit or a circuit designer can modify a circuit structure of the receiving-end analog circuit 150 or determine the component parameters of the receiving-end analog circuit 150 accordingly. In greater detail, the filter in the receiving-end analog circuit 150 may be but not limited to a Butterworth filter or a Chebyshev filter. Furthermore, the control circuit or the circuit designer can determine or modify a capacitance value of the filter in the receiving-end analog circuit 150 according to the above process/method to change the filter bandwidth.

As for how to estimate a linear echo signal and a non-linear echo signal of a signal of a receiving-end interface (signal under test) and how to calculate a linear echo return loss and a non-linear echo return loss based on the linear echo signal and the non-linear echo signal, detailed descriptions are provided in the following paragraphs with reference to FIG. 2 and FIG. 3. In the following paragraphs, the receiving-end interface D is taken as an example for detailed illustration. Since the other receiving-end interfaces A-C have similar operations, descriptions in this regard are not provided.

Figure 2:
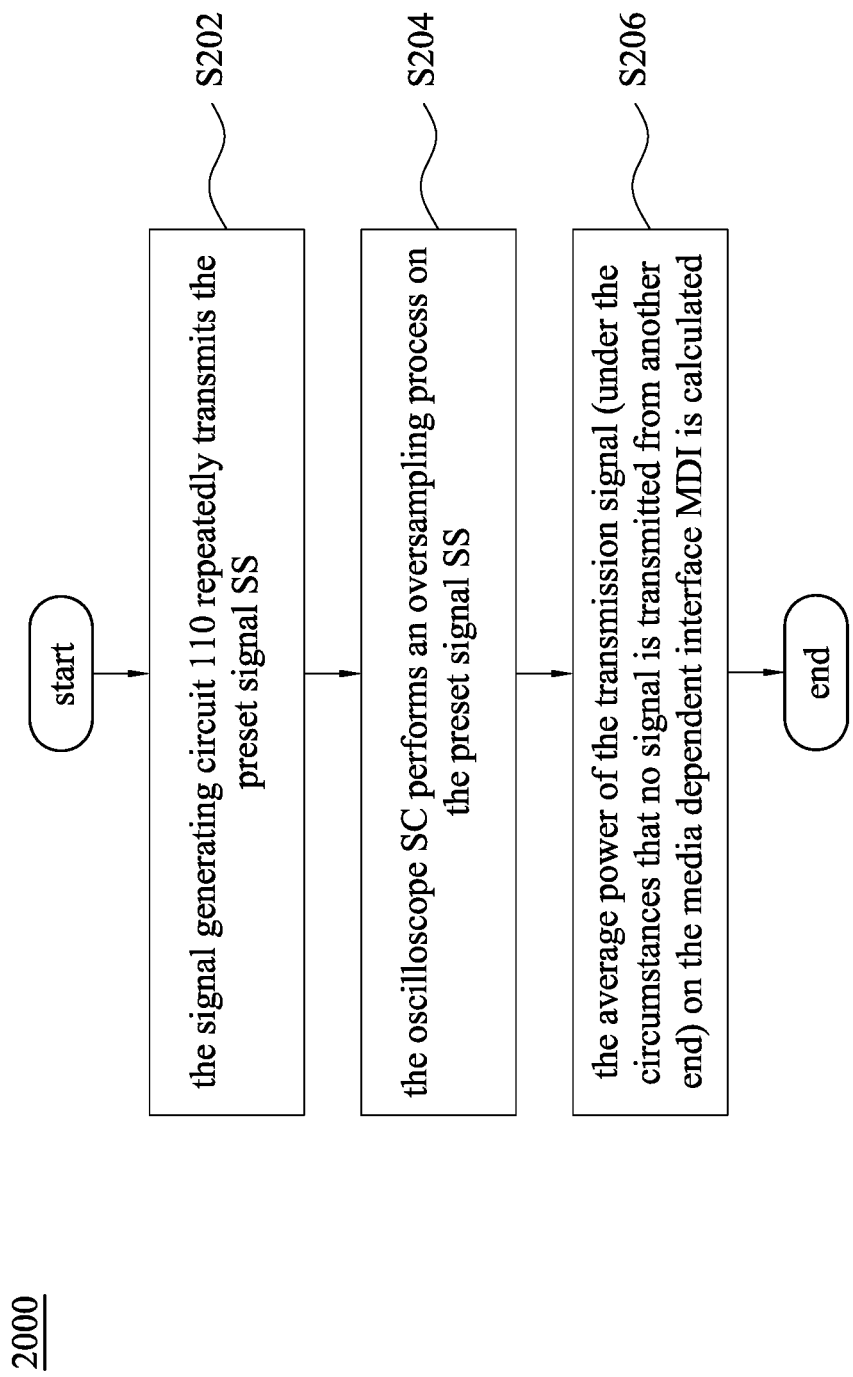
FIG. 2 is a flowchart of an average power estimation method at a transmitting end according to some embodiments of the present disclosure.

Reference is made to FIG. 2. FIG. 2 is a flowchart of an average power estimation method 2000 at a transmitting end according to some embodiments of the present disclosure. Take a Gigabit Ethernet system for example. The average power estimation method 2000 at the transmitting end shown in FIG. 2 may be applied to the echo estimation system S1 of FIG. 1A and the echo estimation system S2 of FIG. 1B to calculate average power of the transmitting-end transmission signal on a media dependent interface MDI.

In some embodiments, when the average power estimation method 2000 at the transmitting end is performed, the transceiver circuitry 100 may be coupled to the transceiver circuitry 300 by the twisted pair TP (as shown in FIG. 1A), but no linking is performed, and no linking is attempted. That is to say, a receiving end of the transceiver circuitry 100 does not receive a transmission signal from the transceiver circuitry 300. The purpose of this is to simulate the load line, which is seen by a transmitting end of the device under test when it is actually linked with a link partner, but in this simulation of load line, there is no signal from a far end and only a near-end echo signal is present. In another operation method, the transceiver circuitry 100 may be coupled to a resistor R by the twisted pair TP (as shown in FIG. 1B). An oscilloscope SC is coupled in parallel with the transceiver circuitry 300 or the resistor R. The oscilloscope SC is used to measure a signal on the medium dependent interface MDI.

In operation S202, the signal generating circuit 110 repeatedly transmits the preset signal SS. For example, the preset signal SS includes N symbols and the preset signal SS is repeatedly transmitted K times. N is, for example, 2047. K is, for example, 100. However, the present disclosure is not limited to these values.

In operation S204, the oscilloscope SC performs an oversampling process on the preset signal SS. For example, the oscilloscope SC uses U times the symbol rate to perform oversampling on the preset signal SS. U is, for example, 40. Accordingly, the oscilloscope SC records a total of 2047×100×40 (N×K×U) sampling points. However, the present disclosure is not limited to these values.

In operation S206, the average power of the transmission signal (under the situation that no signal is transmitted from a far end) on the media dependent interface MDI is calculated. As mentioned above, when the average power estimation method 2000 at the transmitting end is performed, the transceiver circuitry 100 does not receive the transmission signal from the transceiver circuitry 300. Accordingly, the average power of the transmission signal on the media dependent interface MDI may be calculated based on the sampling points recorded by the oscilloscope SC. The calculated average power on the media dependent interface MDI may be used in a subsequent echo estimation method 3000 shown in FIG. 3 to further calculate the linear echo return loss and the non-linear echo return loss.

Figure 3:
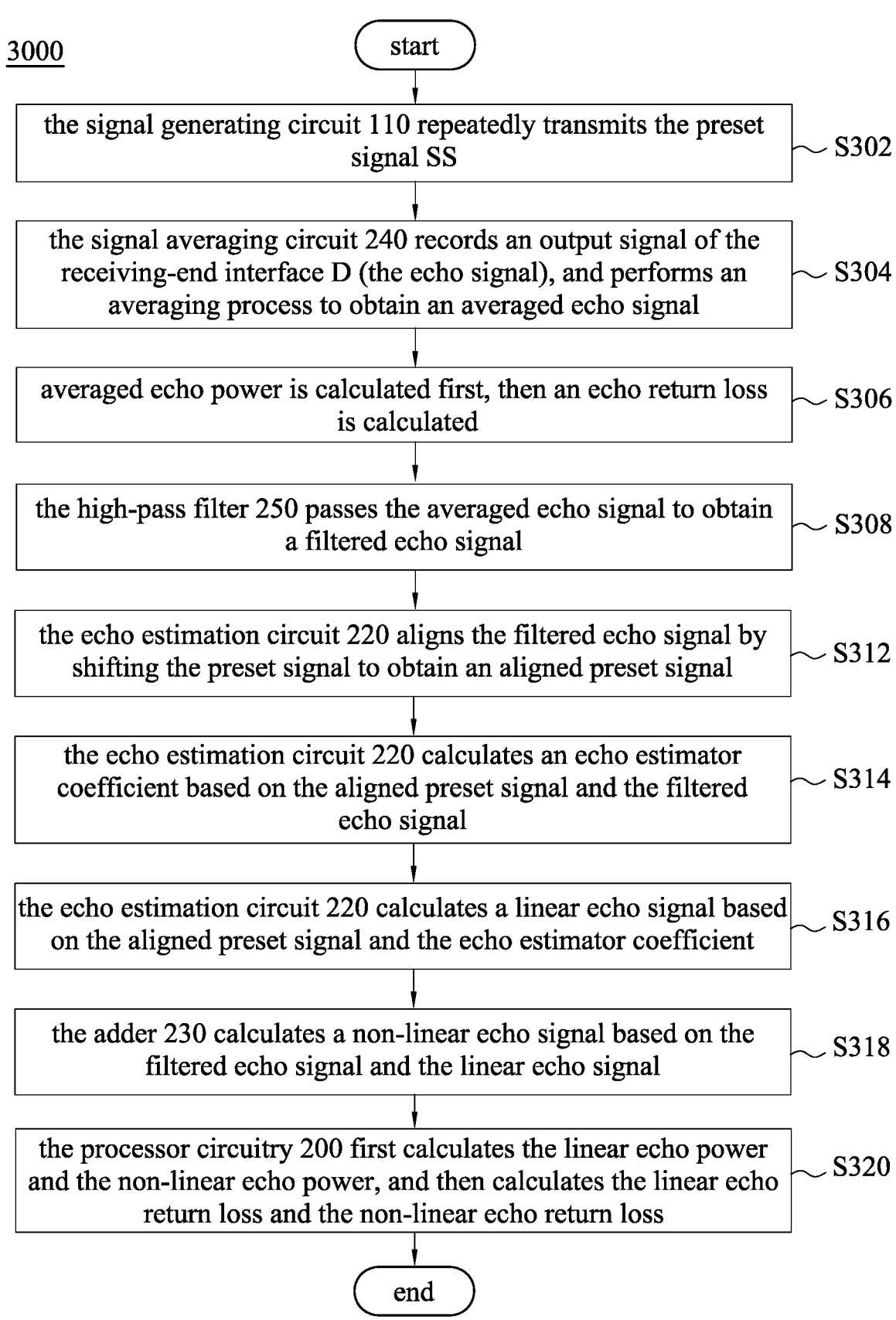
FIG. 3 is a flowchart of an echo estimation method according to some embodiments of the present disclosure.

Reference is made to FIG. 3. FIG. 3 is a flowchart of an echo estimation method 3000 according to some embodiments of the present disclosure. The echo estimation method 3000 shown in FIG. 3 may be applied to the echo estimation system S1 of FIG. 1A and the echo estimation system S2 of FIG. 1B to calculate the linear echo return loss and the non-linear echo return loss.

In some embodiments, when the echo estimation method 3000 is performed, the transceiver circuitry 100 may be coupled to the transceiver circuitry 300 by the twisted pair TP (as shown in FIG. 1A), but no linking is performed, and no linking is attempted. In another operation method, the transceiver circuitry 100 is not coupled to the transceiver circuitry 300, but is coupled to the resistor R by the twisted pair TP (as shown in FIG. 1B).

In operation S302, the signal generating circuit 110 repeatedly transmits the preset signal SS. For example, the preset signal SS includes N symbols and the preset signal SS is repeatedly transmitted K times.

In operation S304, the signal averaging circuit 240 records an output signal of the receiving-end interface D (the signal under test) (that is, the echo signal), and performs an averaging process to obtain an averaged echo signal $E_{avg}$. For example, if the signal averaging circuit 240 records M periods, it means that the signal averaging circuit 240 records M×N symbols. The signal averaging circuit 240 performs the averaging process on the M×N symbols to obtain the averaged echo signal $E_{avg}$. In greater detail, a first symbol of each period in the M periods are averaged, a second symbol of each period in the M periods are averaged, and so on, to obtain the averaged echo signal $E_{avg}$ including N symbols. The purpose of the averaging process is to eliminate various kinds of noises whose expected values are zero. Additionally, the above method of recording the signal under test includes but not limited to capturing the digital signal directly on the receiving-end interface D, and not limited to sampling the analog signal at a pinout on the receiving-end interface A, B or C.

In operation S306, averaged echo power is calculated first, then an echo return loss is calculated. In some embodiments, a ratio of power of the averaged echo signal $E_{avg}$ obtained in operation S304 to the averaged power on the media dependent interface MDI obtained in operation S206 of FIG. 2 is calculated to obtain the echo return loss.

In operation S308, the high-pass filter 250 passes the averaged echo signal $E_{avg}$ to obtain a filtered echo signal E0. The purpose of the high-pass filter 250 is to filter out a DC component and decrease a number of taps of channel impulse response.

In operation S312, the echo estimation circuit 220 aligns the filtered echo signal E0 by shifting the preset signal SS to obtain an aligned preset signal. In greater detail, a correlation process is performed on the shifted preset signal SS and the filtered echo signal E0 after each shift. For example, if the preset signal SS includes N (for example: 2047) symbols, then it is necessary to perform N (for example: 2047) shift processes and correlation processes. When one of the shifted preset signals SS has a highest correlation with the filtered echo signal E0, it means that this shifted preset signal SS is aligned with the filtered echo signal EQ. This shifted preset signal SS is called the aligned preset signal.

In operation S314, the echo estimation circuit 220 calculates an echo estimator coefficient based on the aligned preset signal obtained in operation S312 and the filtered echo signal E0 obtained in operation S308. For example, it is assumed that the aligned preset signal obtained in operation S312 is a real matrix A=[A(1), A(2), . . . , A(N)], the filtered echo signal obtained in operation S308 is a real matrix E0=[E0(1), E0(2), . . . , E0(N)], the echo estimator coefficient is a real matrix C and its length is M, C=[C(1), C(2), . . . , C(M)], where M and N are positive integers and M is less than N. The echo estimator coefficient C is obtained by the following formula (1)-formula (7):

$$AA = \begin{bmatrix} A(1) & A(2) & \ldots & A(M-1) & A(M) \\ A(2) & A(3) & \ldots & A(M) & A(M+1) \\ \vdots & \vdots & \ddots & \vdots & \vdots \\ A(N-1) & A(N) & \ldots & A(M-3) & A(M-2) \\ A(N) & A(1) & \ldots & A(M-2) & A(M-1) \end{bmatrix} \quad \text{formula(1)}$$

$$AA \cdot C^T = E0^T \quad \text{formula(2)}$$

Formula (2) is understood as having N simultaneous equations. If each of the equations cannot be constructed by linear combinations of the other equations, then N simultaneous equations require N unknown numbers to solve. That is, a length of C needs to be N.

In circuit design, M is designed to be less than N, which means that it is impossible to find a C that satisfies the N simultaneous equations. Under this restriction, the least mean square method is used to find a solution $C^T$, so that $(AA \cdot C^T - E0^T)^T \cdot (AA \cdot C^T \cdot E0^T)$ is the minimum, such as the following formula (3):

$$\min_{C^T}((AA \cdot C^T - E0^T)^T \cdot (AA \cdot C^T - E0^T)) \quad \text{formula(3)}$$

Expand the cost function $J(C^T) = (AA \cdot C^T - E0^T)^T \cdot (AA \cdot C^T - E0^T)$ to obtain the following formula (4):

$$J(C^T) = C \cdot AA^T \cdot AA \cdot C^T - C \cdot AA^T \cdot E0^T - E0 \cdot AA \cdot C^T + E0 \cdot E0^T \quad \text{formula(4)}$$

Let $\partial J(C)/(\partial C^T) = 0$, as shown in the following formula (5), and the following formula (6) and formula (7) is obtained step by step:

$$\frac{\partial J(C^T)}{\partial C^T} = 2 \cdot AA^T \cdot AA \cdot C^T - AA^T \cdot E0^T - AA^T \cdot E0^T = 0 \quad \text{formula(5)}$$

$$AA^T \cdot AA \cdot C^T = AA^T \cdot E0^T \quad \text{formula(6)}$$

$$C^T = (AA^T \cdot AA)^{-1} \cdot AA^T \cdot E0^T \quad \text{formula(7)}$$

where T represents the transpose operation of the matrix.

In operation S316, the echo estimation circuit 220 calculates a linear echo signal E1 based on the aligned preset signal obtained in operation S312 and the echo estimator coefficient obtained in operation S314. For example, the linear echo signal E1 is obtained by the following formula (8):

$$E1^T = AA \cdot C^T \quad \text{formula(8)}$$

where E1 is a real matrix, E1=[E1(1), E1(2), . . . E1(N)].

In operation S318, the adder 230 calculates a non-linear echo signal E2 based on the filtered echo signal E0 obtained in operation S308 and the linear echo signal E1 obtained in operation S316. For example, the adder 230 subtracts the linear echo signal E1 obtained in operation S316 from the filtered echo signal E0 to obtain the non-linear echo signal E2.

In operation S320, the processor circuitry 200 first calculates the linear echo power and the non-linear echo power, and then calculates the linear echo return loss and the non-linear echo return loss. In some embodiments, the signal is squared and then averaged to obtain the signal power. In some embodiments, a ratio of power of the linear echo signal E1 obtained in operation S316 to the average power on the medium dependent interface MDI obtained in S206 is calculated to obtain "the linear echo return loss." A ratio of power of the non-linear echo signal E2 obtained in S318 to the average power on the medium dependent interface MDI obtained in S206 is calculated to obtain "the non-linear echo return loss."

As mentioned previously, the power of the linear echo signal E1 (or further calculate the linear echo return loss) and the power of the non-linear echo signal E2 (or further calculate the non-linear echo return loss) of the receiving-end interface A, the receiving-end interface B, the receiving-end interface C, or the receiving-end interface D is utilized to determine the quality of transceiver circuitry 100 or relevant circuit component parameters of the transceiver circuitry 100.

As for how to determine the relevant circuit component parameters of the transceiver circuitry 100, reference is made to FIG. 4. FIG. 4 is a schematic diagram of determining a component parameter according to some embodiments of the present disclosure. References are made to FIG. 1A, FIG. 1B, and FIG. 4. Options 1 to 8 respectively correspond to different capacitance values of a capacitor in the hybrid circuit 140 (for example, U.S. Pat. No. 7,554,933). In FIG. 4, the power of the linear echo signal E1 (the power of the non-linear echo signal E2) corresponding to option 5 is the smallest, which means that the linear echo return loss (the non-linear echo return loss) corresponding to option 5 is the largest. Accordingly, the capacitance value of the capacitor in the transceiver circuitry 100 may be designed to be the capacitance value corresponding to option 5, so as to reduce the effect of the echo signal on the transceiver circuitry 100 to improve the signal-to-noise ratio of the receiving end.

As described above, the echo estimation system and echo estimation method of the present disclosure can estimate the linear echo power and the non-linear echo power of the transceiver circuitry. In this manner, the quality of the transceiver circuitry or the relevant circuit component parameters can be effectively/accurately determined to meet system requirements.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An echo estimation system comprising:
    a transceiver circuitry; and
    a processor circuitry coupled to the transceiver circuitry, wherein the processor circuitry is configured to calculate linear echo power and non-linear echo power based on a signal under test in the transceiver circuitry, wherein the linear echo power and the non-linear echo power are utilized to determine a quality of the transceiver circuitry or utilized to determine component parameters of the transceiver circuitry, wherein the processor circuitry comprises:
        a signal averaging circuit configured to generate an averaged echo signal based on the signal under test;
        a high-pass filter configured to generate a filtered echo signal based on the averaged echo signal; and
        an echo estimation circuit configured to generate a linear echo signal based on a preset signal and the filtered echo signal.

2. The echo estimation system of claim 1, wherein the transceiver circuitry comprises:
    a signal generating circuit configured to generate the preset signal, wherein the transceiver circuitry generates the signal under test based on the preset signal.

3. The echo estimation system of claim 1, wherein the echo estimation circuit is further configured to generate an aligned preset signal based on the preset signal and the filtered echo signal, generate an echo estimator coefficient based on the aligned preset signal and the filtered echo signal, and generate the linear echo signal based on the aligned preset signal and the echo estimator coefficient.

4. The echo estimation system of claim 1, wherein the processor circuitry is further configured to generate a non-linear echo signal based on the filtered echo signal and the linear echo signal.

5. The echo estimation system of claim 4, wherein the processor circuitry further comprises:
    an adder configured to calculate a difference between the filtered echo signal and the linear echo signal as the non-linear echo signal.

6. The echo estimation system of claim 4, wherein the processor circuitry is further configured to calculate the linear echo power based on the linear echo signal, and calculate a linear echo return loss based on the linear echo power and power on a media dependent interface, wherein the processor circuitry is further configured to generate the non-linear echo power based on the non-linear echo signal, and calculate a non-linear echo return loss based on the non-linear echo power and the power on the media dependent interface, wherein the linear echo return loss or the non-linear echo return loss is utilized to determine the quality of the transceiver circuitry or utilized to determine the component parameters of the transceiver circuitry.

7. The echo estimation system of claim 6, wherein the power on the media dependent interface is measured under a first condition or a second condition, wherein the first condition is that the transceiver circuitry is coupled to another transceiver circuitry, and the second condition is that the transceiver circuitry is coupled to a resistor.

8. The echo estimation system of claim 6, wherein the linear echo return loss and the non-linear echo return loss are utilized to determine whether a circuit corresponding to the signal under test in the transceiver circuitry is abnormal or not.

9. The echo estimation system of claim 1, wherein the transceiver circuitry comprises a plurality of receiving-end interfaces, and the signal under test is generated on one of the receiving-end interfaces.

10. An echo estimation method comprising:
    generating a signal under test by a transceiver circuitry; and
    calculating linear echo power and non-linear echo power based on the signal under test by a processor circuitry, wherein the linear echo power and the non-linear echo power are utilized to determine a quality of the transceiver circuitry or utilized to determine component parameters of the transceiver circuitry, wherein calculating the linear echo power based on the signal under test by the processor circuitry comprises:
        generating an averaged echo signal based on the signal under test by a signal averaging circuit of the processor circuitry;
        generating a filtered echo signal based on the averaged echo signal by a high-pass filter of the processor circuitry; and
        generating a linear echo signal based on a preset signal and the filtered echo signal by an echo estimation circuit of the processor circuitry.

11. The echo estimation method of claim 10, wherein generating the signal under test by the transceiver circuitry comprises:
    generating the preset signal by a signal generating circuit of the transceiver circuitry, wherein the transceiver circuitry generates the signal under test based on the preset signal.

12. The echo estimation method of claim 10, wherein generating the linear echo signal based on the preset signal and the filtered echo signal by the echo estimation circuit further comprises:
    generating an aligned preset signal based on the preset signal and the filtered echo signal by the echo estimation circuit;
    generating an echo estimator coefficient based on the aligned preset signal and the filtered echo signal by the echo estimation circuit; and
    generating the linear echo signal based on the aligned preset signal and the echo estimator coefficient by the echo estimation circuit.

13. The echo estimation method of claim 10, further comprising:
    generating a non-linear echo signal based on the filtered echo signal and the linear echo signal by the processor circuitry.

14. The echo estimation method of claim 13, wherein generating the non-linear echo signal based on the filtered echo signal and the linear echo signal by the processor circuitry further comprises:
    calculating a difference between the filtered echo signal and the linear echo signal as the non-linear echo signal by an adder.

15. The echo estimation method of claim 13, further comprising:
   calculating the linear echo power based on the linear echo signal by the processor circuitry;
   calculating a linear echo return loss based on the linear echo power and power on a media dependent interface by the processor circuitry;
   generating the non-linear echo power based on the non-linear echo signal by the processor circuitry; and
   calculating a non-linear echo return loss based on the non-linear echo power and the power on the media dependent interface by the processor circuitry,
   wherein the linear echo return loss or the non-linear echo return loss is utilized to determine the quality of the transceiver circuitry or utilized to determine the component parameters of the transceiver circuitry.

16. The echo estimation method of claim 15, wherein the power on the media dependent interface is measured under a first condition or a second condition, wherein the first condition is that the transceiver circuitry is coupled to another transceiver circuitry, and the second condition is that the transceiver circuitry is coupled to a resistor.

17. The echo estimation method of claim 15, wherein the linear echo return loss and the non-linear echo return loss are utilized to determine whether a circuit corresponding to the signal under test in the transceiver circuitry is abnormal or not.

18. The echo estimation method of claim 10, wherein the transceiver circuitry comprises a plurality of receiving-end interfaces, and the signal under test is generated on one of the receiving-end interfaces.

\* \* \* \* \*